United States Patent
Singh et al.

(10) Patent No.: US 12,470,617 B2
(45) Date of Patent: Nov. 11, 2025

(54) DYNAMIC LATENCY ESTIMATION FOR AUDIO STREAMS

(71) Applicant: Mixhalo Corp., San Francisco, CA (US)

(72) Inventors: Vikram Singh, San Francisco, CA (US); Charles Edward Luckhardt, IV, San Francisco, CA (US)

(73) Assignee: Mixhalo Corp., San Francisco, CA (US)

( * ) Notice: Subject to any disclaimer, the term of this patent is extended or adjusted under 35 U.S.C. 154(b) by 463 days.

(21) Appl. No.: 17/864,720

(22) Filed: Jul. 14, 2022

(65) Prior Publication Data

US 2023/0020399 A1    Jan. 19, 2023

Related U.S. Application Data

(60) Provisional application No. 63/222,950, filed on Jul. 16, 2021.

(51) Int. Cl.
*H04W 24/08*    (2009.01)
*H04B 17/309*    (2015.01)
(Continued)

(52) U.S. Cl.
CPC .......... *H04L 65/80* (2013.01); *H04B 17/309* (2015.01); *H04L 65/60* (2013.01); *H04W 24/08* (2013.01)

(58) Field of Classification Search
CPC ........ H04L 65/80; H04L 65/60; H04W 24/08; H04W 88/00; H04W 88/02; H04W 88/08;
(Continued)

(56) References Cited

U.S. PATENT DOCUMENTS

| | | | |
|---|---|---|---|
| 8,938,078 B2 † | 1/2015 | Meyer | |
| 10,481,859 B2 | 11/2019 | Tull et al. | |

(Continued)

FOREIGN PATENT DOCUMENTS

| | | | | |
|---|---|---|---|---|
| WO | WO-94/04010 | | 2/1994 | |
| WO | WO 00/28740 | * | 5/2000 | ............... H04N 7/15 |
| WO | WO 2019002179 A1 | * | 1/2019 | ............. G11B 27/10 |

OTHER PUBLICATIONS

Atti et al. (CN 107408395 A), Conference Audio Management (see title) (Year: 2017).*

(Continued)

*Primary Examiner* — San Htun
(74) *Attorney, Agent, or Firm* — Cesari and McKenna, LLP

(57) ABSTRACT

Systems and methods for packet dynamic latency estimation for audio streams may include, for example, capturing a first audio signal using a microphone of a computing device; receiving a second audio signal at the computing device via wireless communications from an access point; determining a set of estimates of a delay of the first audio signal relative to the second audio signal based on a cross-correlation at respective analysis steps within the first audio signal and the second audio signal; determining an average delay and a confidence interval for the set of estimates of the delay; comparing the confidence interval to a threshold duration; and, responsive to the confidence interval being less than the threshold duration, playing, using a speaker controlled by the computing device, an audio signal received from the access point with an added delay determined based on the average delay.

17 Claims, 7 Drawing Sheets

(51) Int. Cl.
*H04L 65/60* (2022.01)
*H04L 65/80* (2022.01)

(58) Field of Classification Search
CPC . H04W 92/00; H04W 28/0242; H04W 28/06; H04W 28/065; H04W 28/0975; H04W 28/0967; H04W 28/0236; H04W 56/004; H04W 56/005; H04W 56/0055; H04W 56/0045; H04B 17/309; H04B 17/364; H04R 2227/001; H04R 2227/003; H04R 27/00; H04R 2420/07; G10L 19/167; G10L 19/008; G10L 19/002; G10L 19/16; G10L 15/07; G10L 17/00; G10L 2019/00; G10L 2019/0006; H04S 7/308; H04S 7/00; H04S 5/00

See application file for complete search history.

(56) References Cited

U.S. PATENT DOCUMENTS

| | | | | |
|---|---|---|---|---|
| 11,132,172 | B1* | 9/2021 | Naik et al. | G06F 3/165 |
| 2007/0253561 | A1* | 11/2007 | Williams et al. | 381/58 |
| 2012/0087507 | A1* | 4/2012 | Meyer | 381/56 |
| 2013/0094683 | A1* | 4/2013 | Hansen | 381/309 |
| 2014/0003611 | A1* | 1/2014 | Mohammad et al. | H04R 3/005 |
| 2017/0019743 | A1 | 1/2017 | Tull | |
| 2018/0233136 | A1* | 8/2018 | Torok et al. | H04R 3/12 |
| 2018/0329670 | A1† | 11/2018 | Einziger | |
| 2019/0179597 | A1* | 6/2019 | Tull | H04S 7/301 |
| 2019/0327524 | A1* | 10/2019 | Milavsky et al. | |
| 2020/0302948 | A1† | 9/2020 | Gossard | |
| 2020/0357426 | A1* | 11/2020 | Trella | G10L 25/69 |
| 2021/0058517 | A1* | 2/2021 | Serbajlo et al. | H04M 3/568 |
| 2021/0092514 | A1* | 3/2021 | Agarwala et al. | H04R 3/005 |
| 2021/0132895 | A1* | 5/2021 | Cengarle et al. | G06F 3/165 |
| 2021/0312920 | A1* | 10/2021 | Stahl | G10L 25/06 |

OTHER PUBLICATIONS

Contreras et al. (CN 102257750 A) Using the Secondary RF Link Sound Suppression (see title) (Year: 2011).*

Tuchet, et al., Latency and Reliability Analysis of a 5G-Enabled Internet of Musical Things System, IEEE Internet of Things Journal, Jan. 2024, vol. 11, No. 1.

\* cited by examiner
† cited by third party

DYNAMIC LATENCY ESTIMATION FOR AUDIO STREAMS

CROSS-REFERENCE TO RELATED APPLICATION(S)

This application claims the benefit of U.S. Provisional Application No. 63/222,950, filed on Jul. 16, 2022. The content of the foregoing application is incorporated herein by reference in its entirety for all purposes.

TECHNICAL FIELD

This disclosure relates to dynamic latency estimation for audio streams.

BACKGROUND

Cross-correlation of two related signals may be used to estimate a relative delay between the two signals. The cross-correlation function works by summing the product of every frame of each signal and then identifying the peak of the newly created signal. For example, if we have a signal with frame values of [5, 10, −2, 5] and cross correlate it with a signal containing frame values [2, 8, −5, 2] at zero frame offset, the method will return the value: (5*2)+(10*8)+(−2*−5)+(5*2)=110. The value can be compared to the cross-correlation value of the samples at different offsets. The offset where the value produced is the largest is the offset where the signals are most correlated.

SUMMARY

Disclosed herein are implementations of dynamic latency estimation for audio streams.

In a first aspect, a system is provided that includes a microphone, a speaker, a memory, a processor, and a network interface. The memory stores instructions executable by the processor to cause the system to capture a first audio signal using the microphone; receive, using the network interface, a second audio signal via wireless communications from an access point; determine a set of estimates of a delay of the first audio signal relative to the second audio signal based on a cross-correlation at respective analysis steps within the first audio signal and the second audio signal; determine an average delay and a confidence interval for the set of estimates of the delay; compare the confidence interval to a threshold duration; and, responsive to the confidence interval being less than the threshold duration, play, using the speaker, an audio signal received from the access point with an added delay determined based on the average delay.

In a second aspect, a method is provided that includes capturing a first audio signal using a microphone of a computing device; receiving a second audio signal at the computing device via wireless communications from an access point; determining a set of estimates of a delay of the first audio signal relative to the second audio signal based on a cross-correlation at respective analysis steps within the first audio signal and the second audio signal; determining an average delay and a confidence interval for the set of estimates of the delay; comparing the confidence interval to a threshold duration; and, responsive to the confidence interval being less than the threshold duration, playing, using a speaker controlled by the computing device, an audio signal received from the access point with an added delay determined based on the average delay.

In a third aspect, a non-transitory computer-readable storage medium is provided that includes executable instructions that, when executed by a processor, facilitate performance of operations, including capturing a first audio signal using a microphone of a computing device; receiving a second audio signal at the computing device via wireless communications from an access point; determining a set of estimates of a delay of the first audio signal relative to the second audio signal based on a cross-correlation at respective analysis steps within the first audio signal and the second audio signal; determining an average delay and a confidence interval for the set of estimates of the delay; comparing the confidence interval to a threshold duration; and, responsive to the confidence interval being less than the threshold duration, playing, using a speaker controlled by the computing device, an audio signal received from the access point with an added delay determined based on the average delay.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
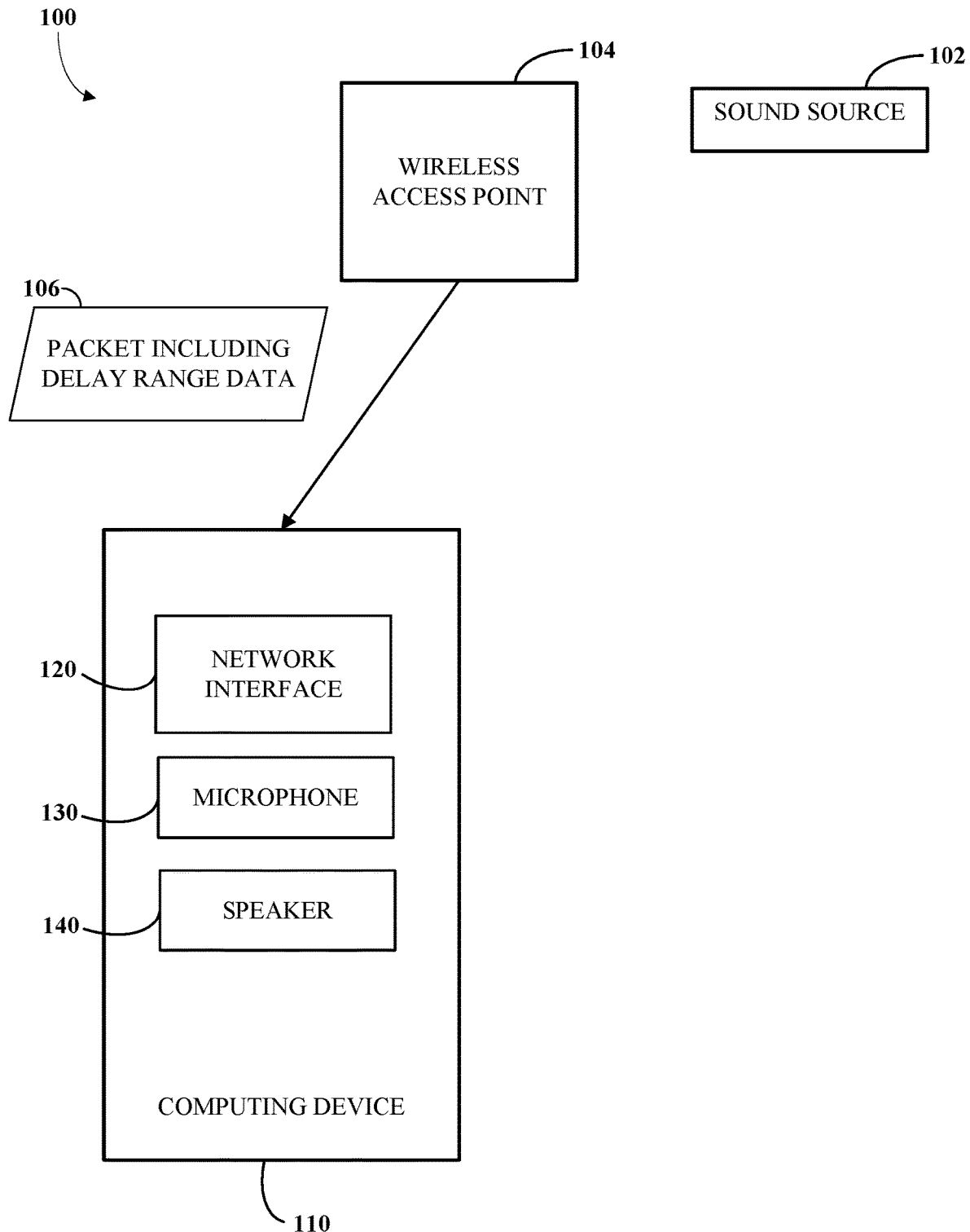
FIG. 1 is a block diagram of an example of a system for dynamic latency estimation for audio streams.

A real time audio streaming platform that may be configured to take soundboard audio from a live event and streams it to currently present attendees in real time. The real time audio streaming platform may take the audio frames from a sound source and transmit the frames over a wireless network in real time to computing devices (e.g., mobile devices).

One of the challenges with this process centers around the speed of sound. If we consider the atmosphere on a standard day at sea level static conditions, the speed of sound is about 761 mph, or 1100 feet/second. While on paper this sounds fast, comparing it to the speed of network data, this may be quite slow. A common simplification for the speed of sound is for every foot of distance travelled 1 millisecond of latency is added, (e.g., if a listener is 200 ft away from a sound source—like a speaker—they would experience 200 ms of audio latency). However, the real time audio streaming platform may operate at a much faster speed (e.g., under 20 ms) and its speed is only slightly affected by distance. As a result, the farther a listener moves away from a sound source, the more disparate the difference between the platform streaming latency and natural audio latency from the sound source becomes. This may generate a jarring listening experience where the platform audio stream and the live event audio are out of time alignment and create a "slapback" effect. Because the platform is streaming to attendees at the live event this challenge (i.e., latency discrepancies between the live audio source and the platform stream) may be common. Addressing this latency discrepancy may provide a more enjoyable/enhanced listening experience to users.

Dynamic Latency—Approach and Overview:

There are many ways to approach the issue of time alignment. In the case of a real time audio streaming platform, a goal is to know the approximate distance a listener is from the sound source (e.g., in the case of a concert, the stage). This can be done with geolocation, however inside an arena this is often not particularly accurate due the materials of the building. Instead, one approach is to time align using the audio at the listeners location paired with a reference stream.

Since the baseline latency of the real time audio streaming platform (e.g., ~20 ms) may be known a priori and this latency may not vary significantly over distances less than 1000 ft, the audio traffic received over the wireless network may be used as a reference signal. The surrounding live audio of the listener may be captured using one or more microphones of the user's mobile device and compared to the reference signal to estimate relative phase shift of the two audio signals. This relative phase shift, combined with a known baseline latency of the platform network stream, may be used to accurately estimate the listener's distance from a sound source.

Various techniques may be used for estimating latency of audio signals in a dynamic environment (e.g., a concert where the listener and other objects may be moving) to enable dynamically adjusting a delay of an audio stream played for the listener to synchronize with the live audio the user is experiencing. In some implementations, determining a delay adjustment includes estimating a distance between the listener and a sound source (e.g., speakers). For example, some techniques for estimating the latency include determination of a cross-correlation (CC). For example, some techniques for estimating the latency include determination of an Average Square Difference (ASDF). For example, some techniques for estimating the latency include determination of a peak analysis (PEAK). For example, some techniques for estimating the latency include determination of a generalized cross-correlation with phase transformation (PHAT). For example, some implementations may be implemented in part using the open-source time delay estimation (TDE) comparison library LibTDE. For example, these techniques may be applied to paired stream and listener/user mic samples taken at actual live events and used to estimate the delay between the two samples.

While the Cross-Correlation module of LibTDE is an accurate and useful tool, it makes many assumptions that do not always hold in real world live event streaming situations. For example, past work using LibTDE, have made the following assumptions that do not conform to live event based real world scenarios:

Quiet/Clean Signal-to-Noise ratio (SNR)—Some past work using the Cross Correlation formula assumes comparison in a quiet room. However, in a live event setting there is lots of additional noise which dramatically reduces the SNR.

Precise Microphone Hardware Arrays—high quality audio microphones have been used and placed in an array setting in order to calculate distance. In some implementations, the real time audio streaming platform strives to achieve robust time delay and distance estimation using a single cell phone microphone.

Controlled reference stream—Given the controlled environment of the test, some past work has used the actual sound generation source as the reference signal. The real time audio streaming platform often cannot make this assumption as it would be impractical to wire every listening device to the sound source (e.g., the soundboard of the live event).

Defined signal source—Some past implementations were designed to use a sine wave to determine the latency/distance. The real time audio streaming platform may utilize the live audio at an event and as such cannot take advantage of the clean waveforms that the prior phase shift estimators expect.

Iterative Speed—Some past work using the CC formula is designed to continually run to increase estimation accuracy. However, running such a process on a listener's mobile device may drain the battery far too quickly to be useful.

The limitations listed above may limit the effectiveness of time delay estimation techniques (e.g., using the CC formula) in real world settings. However, by building additional features and calculations around the CC formula, one can create a more robust and accurate time delay estimation (TDE) that is designed to work in a live event, real world situations.

Input parameters for the real time audio streaming platform's TDE (which uses a CC formula) may include:

Cycle: A cycle consists of a length of a stream recording and mic recording from a computing device (e.g., a mobile device) mic or headphone mic. The length of the cycle is defined by the variables below.

Analysis Window Size: The size (e.g., in milliseconds) of the window where the two clips are compared. This window size may be set variably.

Analysis Step Size: The length (e.g., in milliseconds) the analysis window is advanced after an iteration of analysis done by the CC formula. The Step Size may be set variably.

Steps per Cycle: The number of steps of Step Size length that the real time audio streaming platform's TDE will consider when estimating the delay between the two audio clips in the present Cycle. The Steps per Cycle may be set variably.

Partial Steps: The act of breaking the Steps per Cycle analysis into smaller chunks to decrease redundant calculations.

Max Delay: The maximum distance (e.g., in milliseconds) the two samples could be offset from each other. The Max Delay may be set variably.

Min Delay: The minimum distance (e.g., in milliseconds) the two samples could be offset from each other. The Min Delay may be set variably.

Interval: Used to determine how frequently the TDE process runs. The Interval parameter is used to reduce impact on the device.

In some implementations, the time complexity of the cross-correlation may be related linearly to two input variables: max delay and analysis window.

$$O(n)=O(\text{max delay}*\text{analysis window})=O(mw)$$

The CC function also may be repeated for each analysis step in the sample.

$$O(n)=O(mw)*O(\text{cycle length/analysis step})=O(mwL/s)$$

With these definitions in place, we can now describe the real time audio streaming platform's TDE, which uses a CC formula to estimate the delay in a real-world live event scenario using only the platform streaming system and the microphones of a computing device (e.g., a mobile device). The following changes and improvements may be implemented to create a more accurate TDE:

To tackle the poor SNR (limitation #1) where the likelihood for an error in the measurements is the highest, the largest contributor to the noise will be the crowd. Crowd noise closely resembles white noise in that it is mostly random and covers a large portion of the frequency spectrum. This means we will generally see an equal number of mismeasurements above and below the real delay value with the highest concentration at the real delay value. Therefore, to determine if our mean value for these measurements can safely represent the real delay, we can calculate a confidence interval for the sample measurement distribution. This involves averaging the CC formula result of each Analysis Step across the Steps per Cycle (referred to as the Cycle Data Set) and then applying a confidence interval on this Cycle Data Set. The confidence interval may be determined using a standard deviation with a tolerance amount in variability. For example, the confidence interval can be defined as all values in the Cycle Data Set being 90% within 20 ms of variability. This statistical analysis also handles the Precise Hardware (#2) as well as Defined Signal Source (#4) limitation noted above.

To tackle the lack of a Controlled Reference Stream (#3) the TDE utilizes a network stream from the real time audio streaming platform as the reference. Because the baseline latency of the real time audio streaming platform is known, calculations may be adjusted accordingly.

Additional improvements may center around handling Iterative Speed (#5) assumption. Based on the time complexity definition above, it is useful to keep the Max Delay, Analysis Window, Cycle as small as possible and the Analysis Step value as large as possible without negatively impacting estimates. An example, of an iterative process is described below:

An audio sample is taken from both the real time audio streaming platform as well as captured by one or more microphones of the computing devices (e.g., mobile devices). An analysis is then done by defining an Analysis Window. In some implementations, the Analysis Step Size is then set to half the Analysis Window for each iteration. On each iteration, the Analysis Window is passed to the CC formula which produces a delay estimate value. This delay value can be bounded by the Max Delay variable in order to increase the speed of the CC formula (which is done by bounding how many calculations need to be done per Step Size. The Window is then advanced by the length specified by the analysis Step Size (e.g., half of the analysis window) in the next iteration and the delay is calculated again. This process continues until Cycle or Sample has been completely analyzed.

Increasing or decreasing the analysis window, analysis step size, and max delay values may come with trade-offs and, as such, are variably set, allowing the TDE to be optimized differently in different conditions. Increasing the Analysis Window will increase the robustness of the delay calculation between the signals because of the larger number of audio frames or samples used to compute the value, however this will also increase time complexity and reduce the resolution of the measurements which is utilized to provide insight into how the delay estimation changes over time. Analysis Step Size behaves inversely, as increases in this value will reduce time complexity but at the cost of decreasing delay delta resolution. Increasing max delay increases time complexity and increases the chances of error, so it may be better to keep this value as low as possible. It's therefore generally best to keep the Max Delay, Analysis Window, and Cycle length as small as possible and the Analysis Step value as large as possible without negatively impacting the delay estimates.

In some implementations, the TDE analyzes a delay window of −maxDelay to maxDelay, which is necessary in cases where it is unclear which audio signal is delayed. However, in some cases it is known that the audio signal recorded locally by the microphone will be the signal that is delayed. Thus, the minimum of the delay window may be increased to zero, which may again double the speed of the cross-correlation operation.

In some implementations, the real time audio streaming platform's TDE may utilize a lock-free, dynamic programming approach to calculate and store the values from a previous iteration while calculating with audio data that arrives in real time to reduce the time taken by the algorithm by approximately half. Where the steps of the cross-correlation analysis use overlapping windows of audio samples to determine respective delay estimates in the set of delay estimates determined, parallel processing may be employed and the TDE can reduce calculation time by sharing data from partial steps. For example, two steps that use adjacent analysis windows that overlap by half can share a partial result of the cross-correlation calculation corresponding to the overlapping portion of their analysis windows. The TDE may calculate the CC value for an overlapping chunk first, before calculating and combining it with a result for the remainder of the analysis window. This is because while the doing the analysis for the overlapping portion of the analysis window, the remaining data for the next step of the CC analysis data will arrive. Step calculations are done independently and by prioritizing the shared partial step, the TDE may reduce the amount of redundant calculations and therefore time complexity of the TDE calculation. Because the TDE can reuse the partial step from the earlier of the overlapping analysis windows, the only calculation that needs to be done in the next step is for a remainder of the analysis window of the next step.

FIG. 1 is a block diagram of an example of a system 100 for dynamic latency estimation for audio streams. The system 100 includes a sound source 102; a wireless access point 104 configured to transmit frames of an audio signal from the sound source via a wireless communications network; and a configured computing device 110 to receive the frames of the audio signal and play the audio signal synchronously with the raw audio signal that has propagated from the sound source 102 to the computing device 110 via sound waves in the air. The computing device 110 includes a network interface 120 configured to received data via the wireless communication network; a microphone 130; and a speaker 140. In some embodiments, the computing device 110 is communicatively coupled to one or more headphones. The computing device 110 may be configured to estimate the relative delay between audio captured by the microphone 130 and a streamed audio signal received from the wireless access point 104. In this example, the network interface 120 is used to receive a packet 106 from the wireless access point 104 that includes delay range data that can used by the computing device 110 to more efficiently and/or effectively estimate the relative delay between these audio signals. For example, the system 100 may be configured to implement the technique 500 of FIG. 5. For example, the system 100 may be configured to implement the technique 600 of FIG. 6. For example, the system 100 may be configured to implement the technique 700 of FIG. 7.

The sound source 102 generates an audio signal that propagates as sound waves through the air surrounding the system 100 and is also recorded and passed as a digital signal to the wireless access point 104 for distribution to client devices via an electronic wireless communications network (e.g., a WiFi network). For example, the sound source may be live performers and their musical instruments at a concert. For example, the sound source may be a larger speaker playing audio at a large venue. For example, the wireless access point 104 may include components of the computing device 400 of FIG. 4. For example, the wireless access point 104 may include an audio server that transmits audio data to client devices via the electronic wireless communications network. In some implementations, the wireless access point 104 is configured to multicast audio data of a live concert or musical performance to personal computing devices (e.g., smartphones or tablets) of concert goers via wireless network (e.g., a WiFi network or a cellular data network) in a stadium or other venue.

The computing device 110 may be configured to estimate the relative delay between audio captured by the microphone 130 and a streamed audio signal received from the wireless access point 104 using the network interface 120. For example, the computing device 110 may be a smartphone, a tablet, or a head-mounted display for augmented reality applications. For example, the computing device 110 may include components of the computing device 400 of FIG. 4. A cross-correlation based algorithm may be used to estimate the relative delay between the audio signals. In some implementations, the computing device 110 is configured to capture a first audio signal using the microphone 130; receive, using the network interface 120, a second audio signal via wireless communications from the access point 104; determine a set of estimates of a delay of the first audio signal relative to the second audio signal based on a cross-correlation (e.g., using the technique 200 of FIG. 2) at respective analysis steps within the first audio signal and the second audio signal; determine an average delay and a confidence interval for the set of estimates of the delay; compare the confidence interval to a threshold duration; and, responsive to the confidence interval being less than the threshold duration, play, using the speaker, an audio signal received from the access point with an added delay determined based on the average delay. For example, the confidence interval may be a 90% confidence interval and the threshold duration may be 20 milliseconds. The respective analysis steps may have overlapping analysis windows. For example, the respective analysis steps may have analysis windows that overlap by half with adjacent analysis steps. For example, the computing device 110 may be configured to implement the technique 500 of FIG. 5.

Information received from the wireless access point 104, such as the packet 106 that includes delay range data (e.g., a minimum delay and a maximum delay expected in the vicinity of the wireless access point 104) may be used to limit the range of phase shifts that will be searched using a cross-correlation analysis to estimate the relative delay. For example, information related to delay range from one or more wireless access points may be provided to the computing device 110 using one or more of the schemes illustrated in FIGS. 3A, 3B, and 3C. In some implementations, the computing device 110 is configured to receive, using the network interface 120, a maximum delay parameter via wireless communications from the access point 104; and select, based on the maximum delay parameter, a range of phase shifts to search using cross-correlation to determine the set of estimates of the delay. In some implementations, the computing device 110 is configured to receive, using the network interface 120, a minimum delay parameter via wireless communications from the access point; and select, based on the minimum delay parameter, the range of phase shifts to search using cross-correlation to determine the set of estimates of the delay. In some implementations, the computing device 110 is configured to receive, using the network interface 120, a timestamp via wireless communications from the access point 104; determine a distance estimate for the access point 104 based on the timestamp; and select, based on the distance estimate, a range of phase shifts to search using cross-correlation to determine the set of estimates of the delay.

Figure 2:
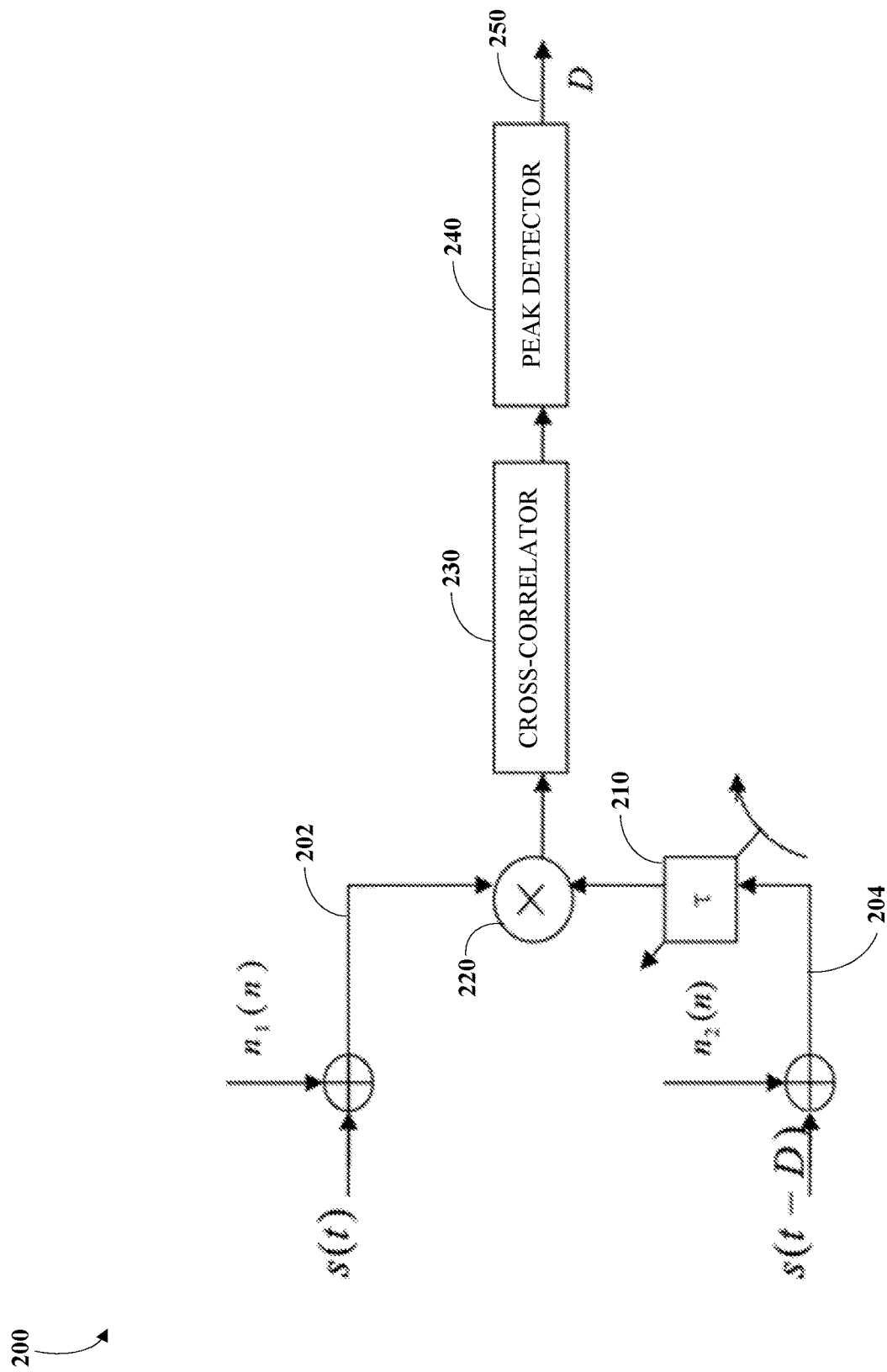
FIG. 2 is a block diagram of an example of a technique using cross-correlation to estimate a delay between two signals over an analysis window.

FIG. 2 is a block diagram of an example of a technique 200 using cross-correlation to estimate a delay between two signals over an analysis window. The technique 200 takes a first audio signal 202 (e.g., an audio signal captured with a local microphone) and a second audio signal 204 (e.g., a streamed audio signal received as frames of samples transmitted via a wireless network) as inputs and outputs an estimated delay 250 between the two input signals. The input signals 202 and 204 are modeled time shifted versions of each other with respective additive noise components. The technique 200 uses a variable delay buffer 210 to introduce a phase shift in the second audio signal 204 that can be varied over a range of delays expected for the application that will be searched to find an estimate of the true relative delay (D) of the two audio signals. The first audio signal 202 and the phase shifted second audio signal 204 are passed to a multiplier 220 and the resulting products are passed to a cross-correlator 230 that adds the products to determine cross-correlations at the various phase shifts that are searched. The resulting cross correlations are passed to a peak detector 240 that identifies the phase shift corresponding to the maximum cross-correlation as the estimated delay 250 between the two input signals. In some implementations, the technique 200 may be applied multiple times to different analysis windows of the two input signals 202 and 204 and a set of resulting estimated delays 250 may be statistically analyzed to determine a more robust estimate of the relative delay between the first audio signal 202 and the second audio signal 204.

Figure 3A:
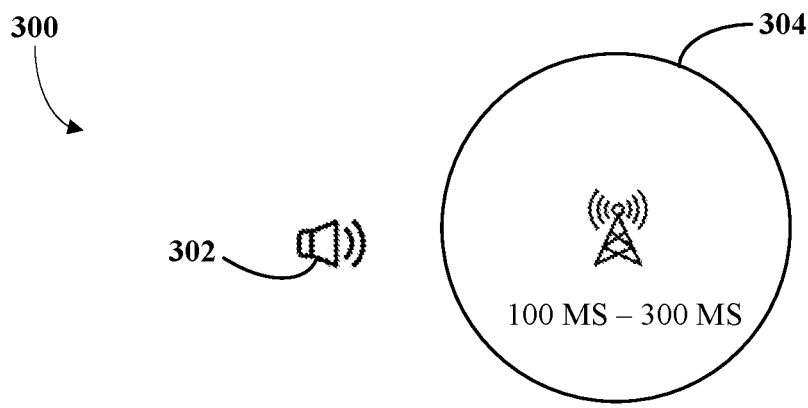
FIG. 3A is an illustration of an example of a system for live streaming synchronous audio that includes a sound source and a paired wireless access point that re-transmits an audio signal from the sound source with delay range parameters for use by client devices receiving its signals.

To reduce the Max Delay variable, a couple of approaches have been built into both the real time audio streaming platform as well as the TDE. One of the most effective ways to improve the speed of the algorithm and reduce measurement errors is by setting the max delay window (the range of possible values the audio could be delayed) to as small a value as feasible. One way to do this is to deliver these values to a client (i.e., a computing device) from the server (e.g., the wireless access point 104) as metadata. Described below are three examples of tools that may be implemented to determine these values:

FIG. 3A is an illustration of an example of a system 300 for live streaming synchronous audio that includes a sound source 302 and a paired wireless access point 304 that re-transmits an audio signal from the sound source 302 with delay range parameters for use by client devices receiving its signals. In this scenario, every access point sends out the same max and min delay values for the entire venue, which the client will use to adjust the cross-correlation input parameters. For example, the maximum and minimum delay parameters may be venue specific. The offset of the samples can be pre-adjusted to match the minimum delay, and the max delay of the CC function can be set to the difference between the min and max values sent from the server. In this example, the wireless access point 304 is broadcasting a minimum delay parameter of 100 milliseconds and a maximum delay parameter of 300 milliseconds, which a client device (not shown) can use to more efficiently synchronize their audio stream with an airborne audio signal from the sound source 302.

Figure 3B:
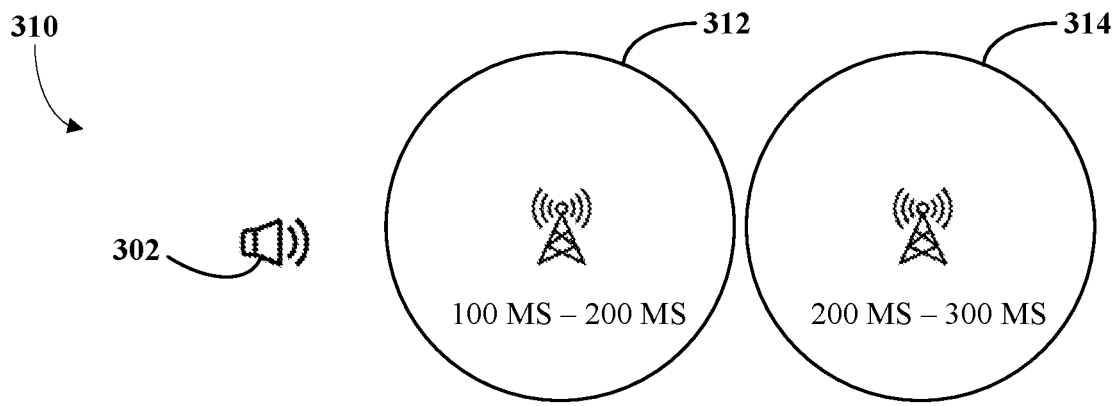
FIG. 3B is an illustration of an example of a system for live streaming synchronous audio that includes a sound source and multiple paired wireless access points that re-transmit an audio signal from the sound source with delay range parameters for use by client devices receiving their signals.

FIG. 3B is an illustration of an example of a system 310 for live streaming synchronous audio that includes a sound source 302 and multiple paired wireless access points 312 and 314 that re-transmit an audio signal from the sound source 302 with delay range parameters for use by client devices receiving their signals. The system 310 has each wireless access point provide the client with a unique delay range based on its location from the sound source 302 and the location of its respective wireless coverage service area. This may enable coverage of larger areas while keeping the possible delay window small. In this example, the wireless access point 312 is broadcasting a minimum delay parameter of 100 milliseconds and a maximum delay parameter of 200 milliseconds. The wireless access point 314, which may be located further from the sound source 302 than the wireless access point 312, is broadcasting a minimum delay parameter of 200 milliseconds and a maximum delay parameter of 300 milliseconds A client device (not shown) can use this delay range information to more efficiently synchronize their audio stream with an airborne audio signal from the sound source 302.

Figure 3C:
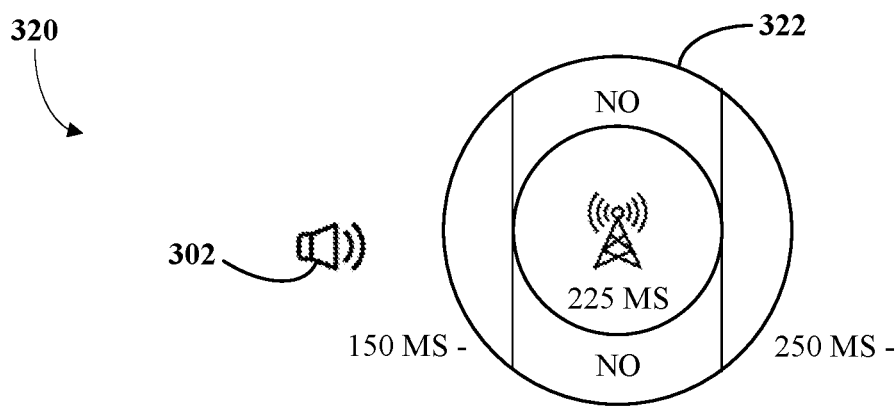
FIG. 3C is an illustration of an example of a system for live streaming synchronous audio that includes a sound source and a paired wireless access point that re-transmits an audio signal from the sound source with timestamps that can be used to determine distance of a client device to the wireless access point and infer delay range parameters based on the distance.

FIG. 3C is an illustration of an example of a system 320 for live streaming synchronous audio that includes a sound source 302 and a paired wireless access point 322 that re-transmits an audio signal from the sound source 302 with timestamps that can be used to determine distance of a client device to the wireless access point 322 and infer delay range parameters based on the distance. The system 320 allows a client to estimate the delay based on distance from the wireless access point 322. Using timestamps on the network messages, the client determines its distance from the wireless access point 322 and therefore may reduce the possible max delay range. For example, these timestamps may be synced using a Precision Time Protocol (PTP), which allows for picosecond time accuracy across all devices (the wireless access point 322 and the client) connected to the real time audio streaming platform. When close enough to the wireless access point 322, we use an average delay value that is guaranteed to be within 30 ms of the real delay. If outside that distance, the client may use cross correlation on a smaller split window that is above and below the center range to determine the real delay. This approach may provide the largest delay range per wireless access point 322.

Figure 4:
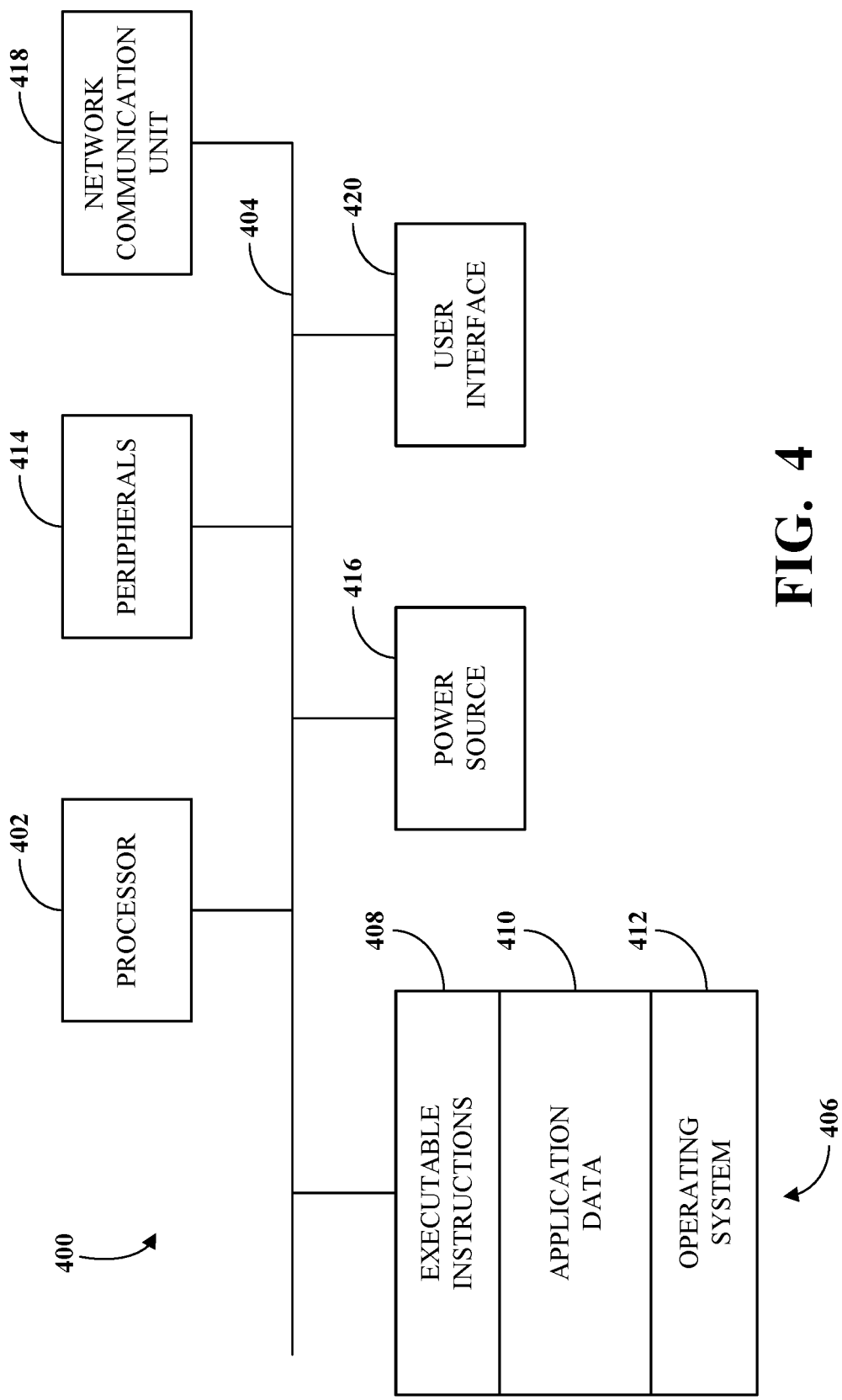
FIG. 4 is a block diagram of an example of an internal configuration of a computing device of the system shown in FIG. 1.

FIG. 4 is a block diagram of an example of an internal configuration of a computing device 400 of the system shown in FIG. 1, such as a wireless access point 104 or the computing device 110. For example, a client device and/or a server device can be a computing system including multiple computing devices and/or a single computing device, such as a mobile phone, a tablet computer, a laptop computer, a notebook computer, a desktop computer, a server computer, and/or other suitable computing devices. A computing device 400 can include components and/or units, such as a processor 402, a bus 404, a memory 406, peripherals 414, a power source 416, a network communication unit 418, a user interface 420, other suitable components, and/or any combination thereof.

The processor 402 can be a central processing unit (CPU), such as a microprocessor, and can include single or multiple processors, having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired and/or networked, including wirelessly networked. In some implementations, the operations of the processor 402 can be distributed across multiple physical devices and/or units that can be coupled directly or across a local area or other type of network. In some implementations, the processor 402 can include a cache, or cache memory, for local storage of operating data and/or instructions. The operations of the processor 402 can be distributed across multiple machines, which can be coupled directly or across a local area or other type of network.

The memory 406 can include volatile memory, non-volatile memory, and/or a combination thereof. For example, the memory 406 can include volatile memory, such as one or more DRAM modules such as DDR SDRAM, and non-volatile memory, such as a disk drive, a solid-state drive, flash memory, Phase-Change Memory (PCM), and/or any form of non-volatile memory capable of persistent electronic information storage, such as in the absence of an active power supply. The memory 406 can include another type of device, or multiple devices, now existing or hereafter developed, capable of storing data and/or instructions for processing by the processor 402. The processor 402 can access and/or manipulate data in the memory 406 via the bus 404. Although shown as a single block in FIG. 4, the memory 406 can be implemented as multiple units. For example, a computing device 400 can include volatile memory, such as RAM, and persistent memory, such as a hard drive or other storage. The memory 406 can be distributed across multiple machines, such as network-based memory or memory in multiple machines performing the operations of clients and/or servers.

The memory 406 can include executable instructions 408; data, such as application data 410; an operating system 412; or a combination thereof for immediate access by the processor 402. The executable instructions 408 can include, for example, one or more application programs, which can be loaded and/or copied, in whole or in part, from non-volatile memory to volatile memory to be executed by the processor 402. The executable instructions 408 can be organized into programmable modules and/or algorithms, functional programs, codes, code segments, and/or combinations thereof to perform various functions described herein. For example, the memory 406 may include instructions executable by the processor 402 to cause a system including the computing device 400 to implement the technique 500 of FIG. 5, the technique 600 of FIG. 6, or the technique 700 of FIG. 7.

The application data 410 can include, for example, user files; database catalogs and/or dictionaries; configuration information for functional programs, such as a web browser, a web server, a database server; and/or a combination thereof. The operating system 412 can be, for example, Microsoft Windows®, Mac OS X®, or Linux®; an operating system for a small device, such as a smartphone or tablet device; or an operating system for a large device, such as a mainframe computer. The memory 406 can comprise one or more devices and can utilize one or more types of storage, such as solid state or magnetic storage.

The peripherals 414 can be coupled to the processor 402 via the bus 404. The peripherals can be sensors or detectors, or devices containing any number of sensors or detectors, which can monitor the computing device 400 itself and/or the environment around the computing device 400. For example, a computing device 400 can contain a geospatial location identification unit, such as a global positioning system (GPS) location unit. As another example, a computing device 400 can contain a temperature sensor for measuring temperatures of components of the computing device 400, such as the processor 402. Other sensors or detectors can be used with the computing device 400, as can be contemplated. In some implementations, a client and/or server can omit the peripherals 414. In some implementations, the power source 416 can be a battery, and the computing device 400 can operate independently of an external power distribution system. Any of the components of the computing device 400, such as the peripherals 414 or the power source 416, can communicate with the processor 402 via the bus 404. Although depicted here as a single bus, the bus 404 can be composed of multiple buses, which can be connected to one another through various bridges, controllers, and/or adapters.

The network communication unit 418 can also be coupled to the processor 402 via the bus 404. In some implementations, the network communication unit 418 can comprise one or more transceivers. The network communication unit 418 provides a connection or link to a network via a network interface, which can be a wired network interface, such as Ethernet, or a wireless network interface. For example, the computing device 400 can communicate with other devices via the network communication unit 418 and the network interface using one or more network protocols, such as Ethernet, TCP, IP, power line communication (PLC), WiFi, infrared, GPRS, GSM, CDMA, TDMA, UMTS, or other suitable protocols.

A user interface 420 can include a display; a positional input device, such as a mouse, touchpad, touchscreen, or the like; a keyboard; and/or any other human and machine interface devices. The user interface 420 can be coupled to the processor 402 via the bus 404. Other interface devices that permit a user to program or otherwise use the computing device 400 can be provided in addition to or as an alternative to a display. In some implementations, the user interface 420 can include a display, which can be a liquid crystal display (LCD), a cathode-ray tube (CRT), a light emitting diode (LED) display (e.g., an OLED display), or other suitable display. The user interface 420 may include an audio driver (e.g., a speaker) configured to convert electronic audio data to sound in medium (e.g., air). For example, a speaker of the user interface 420 may be used to play audio data (e.g., encoding music or speech signals). In some embodiments, the computing device 400 is communicatively coupled to one or more headphones. For example, in some embodiments, the one or more headphones may be used to play audio data.

Figure 5:
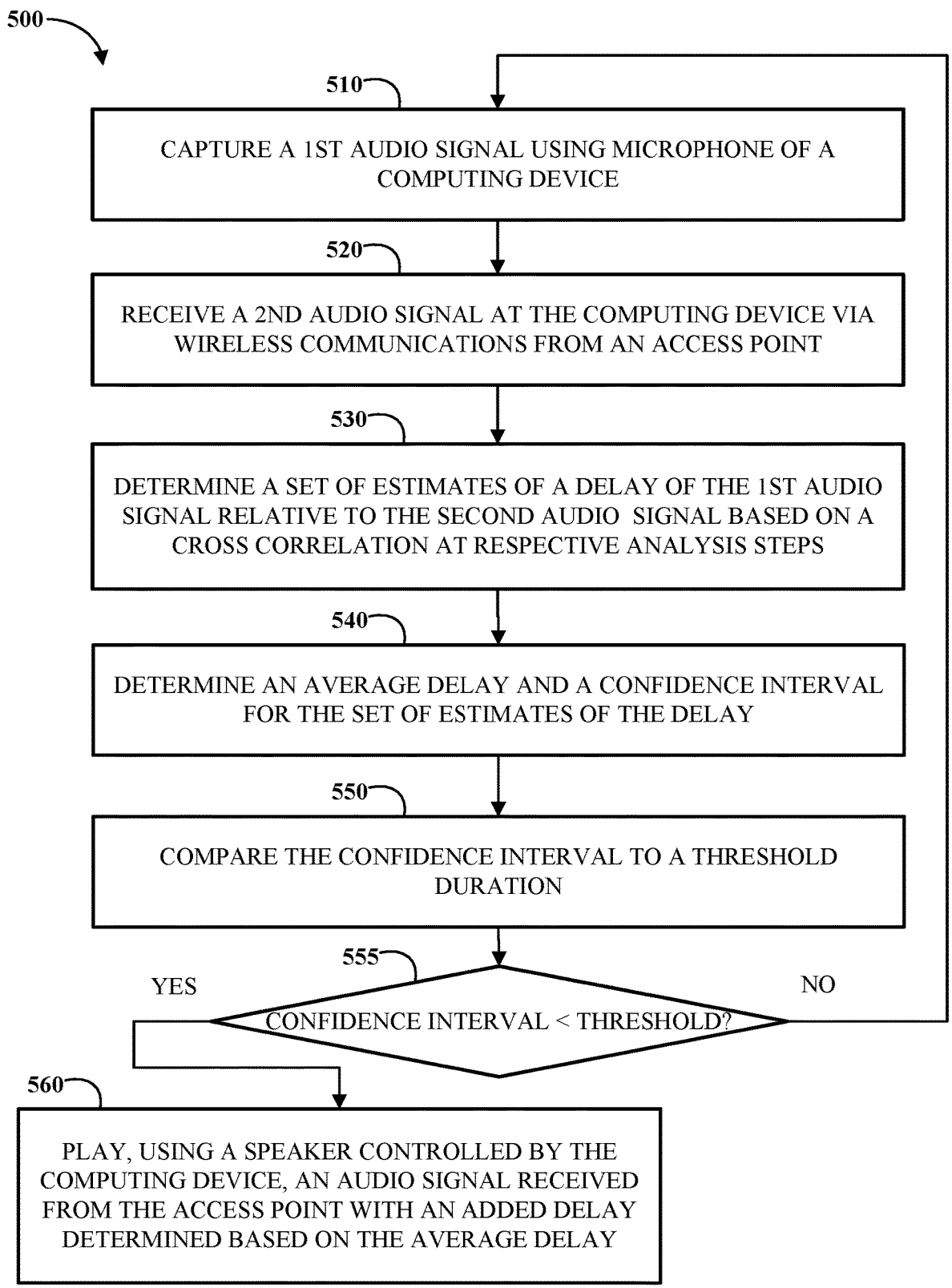
FIG. 5 is a flowchart illustrating an example of a technique for dynamic latency estimation for audio streams.

FIG. 5 is a flowchart illustrating an example of a technique 500 for dynamic latency estimation for audio streams. The technique 500 includes capturing 510 a first audio signal using a microphone of a computing device; receiving 520 a second audio signal at the computing device via wireless communications from an access point; determining 530 a set of estimates of a delay of the first audio signal relative to the second audio signal based on a cross-correlation at respective analysis steps within the first audio signal and the second audio signal; determining 540 an average delay and a confidence interval for the set of estimates of the delay; comparing 550 the confidence interval to a threshold duration; and, responsive to the confidence interval being less than the threshold duration, playing 560, using a speaker controlled by the computing device, an audio signal received from the access point with an added delay determined based on the average delay. For example, the technique 500 may be implemented by the computing device 110 of FIG. 1. For example, the technique 500 may be implemented by the computing device 400 of FIG. 4.

The technique 500 includes capturing 510 a first audio signal using a microphone of a computing device. For example, the microphone may be integrated in a cellphone, a tablet, or a head-mounted display of a user at a live event listening to sound from a distant sound source. For example, the first audio signal may be sampled at 44.1 kHz and encoded in a pulse code modulation format for comparison with the second audio signal.

The technique 500 includes receiving 520 a second audio signal at the computing device via wireless communications from an access point (e.g., the wireless access point 104). For example, the second audio signal may be received 520 using a network interface (e.g., the network interface 120). For example, the second audio signal may be received as a sequence of frames of audio data (e.g., encoding music or speech signals).

The technique 500 includes determining 530 a set of estimates of a delay of the first audio signal relative to the second audio signal based on a cross-correlation at respective analysis steps within the first audio signal and the second audio signal. For example, sets of audio samples from the first audio signal and the second audio may be grouped into different analysis windows to be used in respective analysis steps that determine a respective estimate of delay on the set of estimates of the delay. Together these analysis windows may span a cycle of the two audio signals. In some implementations, the respective analysis steps have overlapping analysis windows. For example, the respective analysis steps have analysis windows that overlap by half with adjacent analysis steps. In an example, the analysis windows for each analysis step may be 2 seconds long and the step size may be 1 second long, so that adjacent analysis windows overlap by half or 1 second. For example, 5 analysis step per cycle may be used, so that a total of 2*5−4=6 seconds of audio data from each of the first audio signal and the second audio signal are used in a cycle. For each analysis steps, a cross-correlation analysis may be performed to determine a respective estimate of the delay in the set of estimates of the delay. For example, a phase shift between the two audio signals that maximizes the cross-correlation over the analysis window may be found and used as the respective estimate of the delay for the analysis step. For example, the technique 200 of FIG. 2 may be implemented to perform an analysis step and determine the respective estimate of the delay for the analysis step. In some implementations, the range of phase shifts searched during an analysis step is limited based on out-of-band information about the range of possible relative delays between the two audio signals, which may serve to reduce the computation complexity and prevent some types of errors. Information about the range of possible relative delays may be received from the access point. For example, the technique 600 of FIG. 6 may be implemented to determine a range of delays to be searched. For example, the technique 700 of FIG. 7 may be implemented to determine a range of delays to be searched. In some implementations, a lock-free, dynamic programming approach may be used to perform an analysis step that generates partial results corresponding to the overlapping portions of two analysis windows, which can be stored and reused in in the later of the two analysis steps to reduce computational complexity further.

The technique 500 includes determining 540 an average delay and a confidence interval for the set of estimates of the delay. This statistical analysis applied to the set of estimates of delay for a cycle may suppress noise and improve the robustness of the final estimate of the relative delay of the first audio signal and the second audio signal. In some embodiments, the confidence interval is one of 80%, 85%, 90%, or 95%, and the threshold duration is one of 16 milliseconds, 18 milliseconds, 20 milliseconds, 22 milliseconds, or 24 milliseconds. For example, in some implementations, the confidence interval is a 90% confidence interval and the threshold duration is 20 milliseconds.

The technique 500 includes comparing 550 the confidence interval to a threshold duration. For example, the threshold duration may be 20 milliseconds. At step 555, if the confidence interval is less than the threshold, then, responsive to the confidence interval being less than the threshold duration, the technique 500 includes playing 560, using a speaker controlled by the computing device, an audio signal received from the access point with an added delay determined based on the average delay. In some embodiments, the technique 500 includes playing, using one or more headphones communicatively coupled to the computing device, the audio signal received from the access point with the added delay determined based on the average delay. In some implementations, the added delay is equal to the average delay. In some implementations, the added delay is offset from the average delay by known or estimated delays through the computing device's recording or playout pathways. In some implementations, the added delay is determined based on the average delay to produce a desired sound effect.

At step 555, if the confidence interval is not less than the threshold, then the average delay may be rejected as an estimate of the relative delay between the first audio signal and the second audio signal. Playout of the second audio signal may be stopped or may proceed using a previous estimate of the relative delay or a default delay. The technique 500 may be repeated with a next cycle of audio samples from the two audio signals to attempt to determine a better estimate of the relative delay of the between the first audio signal and the second audio signal.

Figure 6:
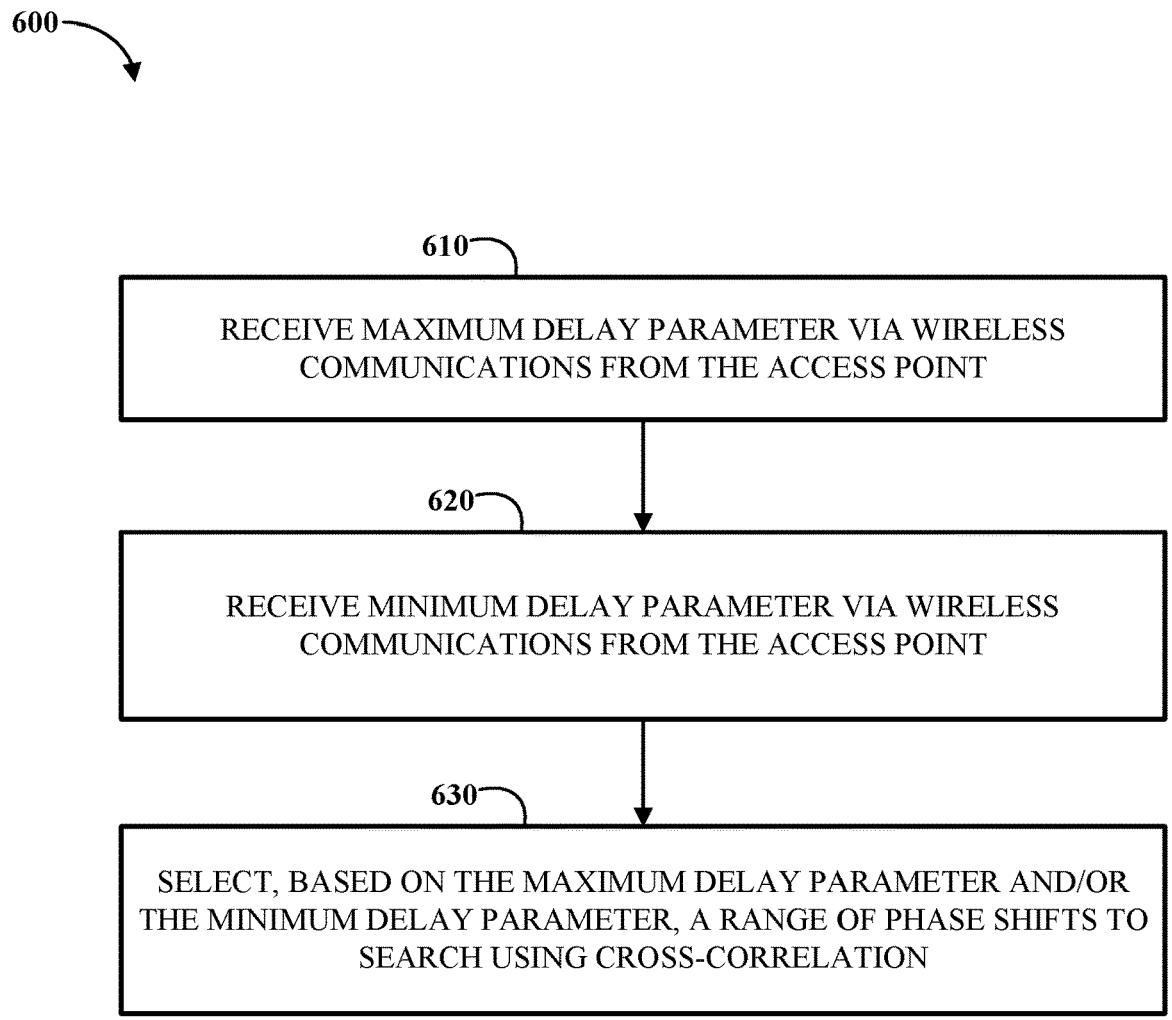
FIG. 6 is a flowchart illustrating an example of a technique for determining a range of phase shifts to be searched using cross-correlation to estimate a delay between two audio signals.

FIG. 6 is a flowchart illustrating an example of a technique 600 for determining a range of phase shifts to be searched using cross-correlation to estimate a delay between two audio signals. The technique 600 includes receiving 610 a maximum delay parameter via wireless communications from the access point; receiving 620 a minimum delay parameter via wireless communications from the access point; and selecting 630, based on the maximum delay parameter and/or the minimum delay parameter, a range of phase shifts to search using cross-correlation to determine the set of estimates of the delay. For example, the maximum delay parameter and/or the minimum delay parameter may be received in a packet (e.g., the packet 106) from the access point. For example, the maximum delay parameter and/or the minimum delay parameter may be intrinsic to the venue and broadcast by all access points in the venue (see, e.g., FIG. 2A). In some implementations, the maximum delay parameter and/or the minimum delay parameter may be specific to each access point (see, e.g., FIG. 2B). For example, a computing device may select the maximum delay parameter and/or the minimum delay parameter to use from among multiple access points based on proximity to the access points or a proxy for proximity, such as received wireless signal strength. For example, the technique 600 may be implemented by the computing device 110 of FIG. 1. For example, the technique 600 may be implemented by the computing device 400 of FIG. 4.

Figure 7:
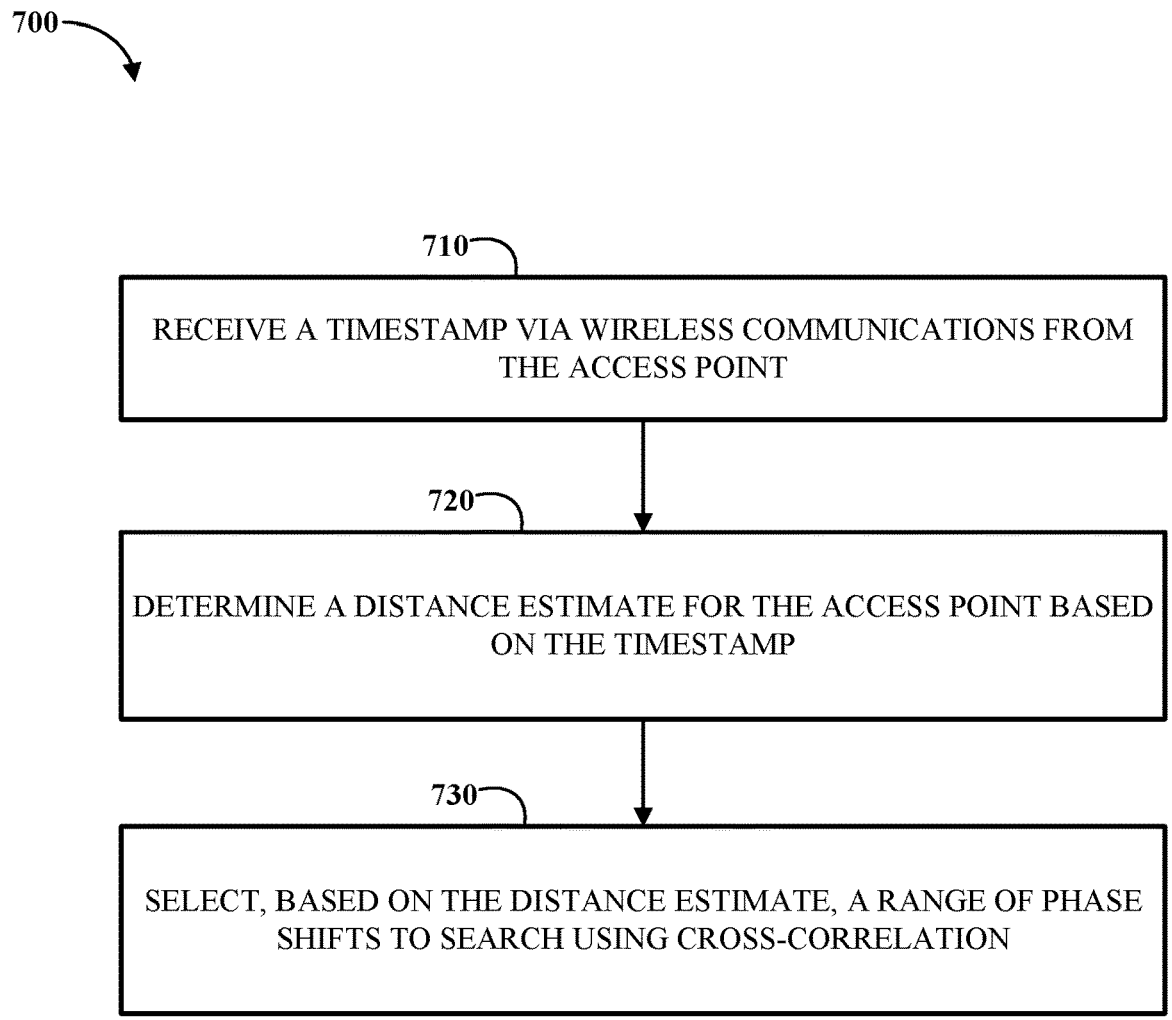
FIG. 7 is a flowchart illustrating an example of a technique for determining a range of phase shifts to be searched using cross-correlation to estimate a delay between two audio signals.

FIG. 7 is a flowchart illustrating an example of a technique 700 for determining a range of phase shifts to be searched using cross-correlation to estimate a delay between two audio signals. The technique 700 includes receiving 710 a timestamp via wireless communications from the access point; determining 720 a distance estimate for the access point based on the timestamp; and selecting 730, based on the distance estimate, a range of phase shifts to search using cross-correlation to determine the set of estimates of the delay. For example, the timestamp may be synced using a Precision Time Protocol (PTP), which allows for picosecond time accuracy across devices. When close enough to the access point, an average delay value that is guaranteed to be within a range (e.g., within 30 ms) of the real delay. If outside that distance, cross-correlation may be evaluated on a smaller split range that is above and below the center range to determine the real delay (e.g., as described in relation to FIG. 3C). This approach may provide the largest delay range per access point. For example, the technique 700 may be implemented by the computing device 110 of FIG. 1. For example, the technique 700 may be implemented by the computing device 400 of FIG. 4.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
   a microphone;
   a speaker;
   a network interface;
   a memory; and
   a processor, wherein the memory includes instructions executable by the processor to cause the system to:
      capture a first audio signal using the microphone;
      receive, using the network interface, a second audio signal via wireless communications from an access point;
      determine a set of estimates of a delay of the first audio signal relative to the second audio signal based on a cross-correlation at respective analysis steps within the first audio signal and the second audio signal, including:
receiving, using the network interface, a delay parameter via the wireless communications from the access point and selecting, based on the delay parameter, a range of phase shifts to search using cross-correlation to determine the set of estimates of the delay; or
determine an average delay and a confidence interval for the set of estimates of the delay;
compare the confidence interval to a threshold duration; and
responsive to the confidence interval being less than the threshold duration, play, using the speaker, an audio signal received from the access point with an added delay determined based on the average delay.

2. The system of claim 1, in which the confidence interval is a 90% confidence interval and the threshold duration is 20 milliseconds.

3. The system of claim 1, in which the respective analysis steps have overlapping analysis windows.

4. The system of claim 3, in which the respective analysis steps have analysis windows that overlap by half with adjacent analysis steps.

5. A method comprising:
capturing a first audio signal using a microphone of a computing device;
receiving a second audio signal at the computing device via wireless communications from an access point;
determining a set of estimates of a delay of the first audio signal relative to the second audio signal based on a cross-correlation at respective analysis steps within the first audio signal and the second audio signal, including:
receiving, using the network interface, a delay parameter via the wireless communications from the access point and selecting, based on the delay parameter, a range of phase shifts to search using cross-correlation to determine the set of estimates of the delay;
determining an average delay and a confidence interval for the set of estimates of the delay;
comparing the confidence interval to a threshold duration; and
responsive to the confidence interval being less than the threshold duration, playing, using a speaker controlled by the computing device, an audio signal received from the access point with an added delay determined based on the average delay.

6. The method of claim 5, in which the confidence interval is a 90% confidence interval and the threshold duration is 20 milliseconds.

7. The method of claim 5, in which the respective analysis steps have overlapping analysis windows.

8. The method of claim 7, in which the respective analysis steps have analysis windows that overlap by half with adjacent analysis steps.

9. A non-transitory computer-readable storage medium provided that includes executable instructions that, when executed by a processor, facilitate performance of operations, including:
capturing a first audio signal using a microphone of a computing device;
receiving a second audio signal at the computing device via wireless communications from an access point;
determining a set of estimates of a delay of the first audio signal relative to the second audio signal based on a cross-correlation at respective analysis steps within the first audio signal and the second audio signal, including:
receiving, using the network interface, a delay parameter via the wireless communications from the access point and selecting, based on the delay parameter, a range of phase shifts to search using cross-correlation to determine the set of estimates of the delay;
determining an average delay and a confidence interval for the set of estimates of the delay;
comparing the confidence interval to a threshold duration; and
responsive to the confidence interval being less than the threshold duration, playing, using a speaker controlled by the computing device, an audio signal received from the access point with an added delay determined based on the average delay.

10. The non-transitory computer-readable storage medium of claim 9, in which the confidence interval is a 90% confidence interval and the threshold duration is 20 milliseconds.

11. The non-transitory computer-readable storage medium of claim 9, in which the respective analysis steps have overlapping analysis windows.

12. The system of claim 1, wherein the delay parameter is a maximum delay parameter or a minimum delay parameter.

13. The system of claim 1, wherein the delay parameter is based upon a distance estimate for the access point that is determined using a timestamp received from the access point.

14. The method of claim 5, wherein the delay parameter is a maximum delay parameter or a minimum delay parameter.

15. The method of claim 5, wherein the delay parameter is based upon a distance estimate for the access point that is determined using a timestamp received from the access point.

16. The non-transitory computer-readable storage medium of claim 9, wherein the delay parameter is a maximum delay parameter or a minimum delay parameter.

17. The non-transitory computer-readable storage medium of claim 9, wherein the delay parameter is based upon a distance estimate for the access point that is determined using a timestamp received from the access point.

* * * * *